(12) United States Patent
Nguyen et al.

(10) Patent No.: US 10,706,514 B2
(45) Date of Patent: Jul. 7, 2020

(54) SYSTEMS AND METHODS FOR ENHANCED DYNAMIC RANGE INFRARED IMAGING

(71) Applicant: FLIR Systems, Inc., Wilsonville, OR (US)

(72) Inventors: Vu L. Nguyen, Goleta, CA (US); Nicholas Högasten, Santa Barbara, CA (US); Tomas Lannestedt, Stockholm (SE); Magnus Boman, Täby (SE)

(73) Assignee: FLIR SYSTEMS, INC., Wilsonville, OR (US)

( * ) Notice: Subject to any disclaimer, the term of this patent is extended or adjusted under 35 U.S.C. 154(b) by 0 days.

(21) Appl. No.: 15/832,647

(22) Filed: Dec. 5, 2017

(65) Prior Publication Data

US 2018/0096468 A1 Apr. 5, 2018

Related U.S. Application Data (63) Continuation-in-part of application No. PCT/US2016/035848, filed on Jun. 3, 2016.

(60) Provisional application No. 62/171,962, filed on Jun. 5, 2015.

(51) Int. Cl.
| | |
|---|---|
| *G06T 5/50* | (2006.01) |
| *G06T 5/00* | (2006.01) |
| *H04N 5/225* | (2006.01) |
| *H04N 5/33* | (2006.01) |

(Continued)

(52) U.S. Cl.
CPC ............. *G06T 5/009* (2013.01); *G06T 5/50* (2013.01); *H04N 5/2258* (2013.01); *H04N 5/2355* (2013.01); *H04N 5/23245* (2013.01); *H04N 5/33* (2013.01); *G06T 2207/10048* (2013.01); *G06T 2207/20208* (2013.01)

(58) Field of Classification Search
USPC .......................................................... 348/165
See application file for complete search history.

(56) References Cited

U.S. PATENT DOCUMENTS

| | | | |
|---|---|---|---|
| 6,384,414 B1 * | 5/2002 | Fisher ..................... | G01J 5/08 250/339.05 |
| 7,606,484 B1 | 10/2009 | Richards et al. | |

(Continued)

FOREIGN PATENT DOCUMENTS

| | | |
|---|---|---|
| CN | 102510450 | 6/2012 |
| CN | 103907342 | 7/2014 |
| WO | WO 2009/097216 | 8/2009 |

*Primary Examiner* — Behrooz M Senfi (74) *Attorney, Agent, or Firm* — Haynes and Boone, LLP (57) ABSTRACT

Various techniques are provided for using one or more thermal infrared (IR) imaging modules to enhance the dynamic range of images. In one example, devices and methods provide a first IR imaging module that captures a first image, a second IR imaging module optimized for higher IR irradiance that captures a second image, and a processing system that detects saturated pixels of the first image, determines pixels of the second image corresponding to the saturated pixels of the first image, and generates a combined image based on non-saturated pixels of the first image and the pixels of the second image. The IR imaging modules may be a microbolometer focal plane array (FPA) configured for high-gain, and a microbolometer FPA configured for low-gain. The IR imaging modules may be a photon detector FPA and a microbolometer FPA.

20 Claims, 6 Drawing Sheets

(51) Int. Cl.
*H04N 5/235* (2006.01)
*H04N 5/232* (2006.01)

(56) References Cited

U.S. PATENT DOCUMENTS

| | | | |
|---|---|---|---|
| 7,786,438 B1* | 8/2010 | Devilbiss | G01J 5/0862 |
| | | | 250/332 |
| 7,995,859 B2 | 8/2011 | Högasten | |
| 8,515,196 B1 | 8/2013 | Högasten | |
| 2006/0291849 A1* | 12/2006 | Shamir | G03B 7/08 |
| | | | 396/334 |
| 2007/0172221 A1 | 7/2007 | Moriya | |
| 2011/0305388 A1* | 12/2011 | Wedi | G06T 5/005 |
| | | | 382/165 |
| 2012/0194686 A1* | 8/2012 | Lin | H04N 5/2355 |
| | | | 348/208.4 |
| 2012/0224788 A1* | 9/2012 | Jia | H04N 5/235 |
| | | | 382/274 |
| 2014/0037225 A1 | 2/2014 | Högasten et al. | |
| 2014/0085482 A1* | 3/2014 | Teich | H04N 5/3696 |
| | | | 348/164 |
| 2014/0092257 A1 | 4/2014 | Hogasten et al. | |
| 2014/0139685 A1 | 5/2014 | Nussmeier et al. | |
| 2014/0232875 A1 | 8/2014 | Boulanger et al. | |
| 2014/0355904 A1 | 12/2014 | Olsson | |
| 2015/0226612 A1* | 8/2015 | Palanchoke | G01J 5/20 |
| | | | 374/121 |
| 2015/0281749 A1* | 10/2015 | Hutchison | G01J 5/025 |
| | | | 348/164 |
| 2015/0296146 A1* | 10/2015 | Scanlon | H04N 5/247 |
| | | | 348/82 |
| 2016/0343254 A1* | 11/2016 | Rovik | B60Q 9/00 |
| 2017/0064213 A1* | 3/2017 | Windmark | H04N 5/265 |

\* cited by examiner

SYSTEMS AND METHODS FOR ENHANCED DYNAMIC RANGE INFRARED IMAGING

CROSS-REFERENCE TO RELATED APPLICATIONS

This application is a continuation-in-part of International Patent Application No. PCT/US2016/035848 filed Jun. 3, 2016 and entitled "SYSTEMS AND METHODS FOR ENHANCED DYNAMIC RANGE INFRARED IMAGING," which is incorporated herein by reference in its entirety.

International Patent Application No. PCT/US2015/035848 filed Jun. 3, 2016 claims priority to and the benefit of U.S. Provisional Patent Application No. 62/171,962 filed Jun. 5, 2015 and entitled "SYSTEMS AND METHODS FOR ENHANCED DYNAMIC RANGE INFRARED IMAGING," which is hereby incorporated by reference in its entirety.

TECHNICAL FIELD

One or more embodiments relate generally to imaging devices and more particularly, for example, to using one or more thermal infrared (IR) imaging modules to enhance the dynamic range of images while maintaining high signal fidelity in an irradiance range.

BACKGROUND

Focal plane arrays (FPAs) that detect IR radiation (e.g., thermal IR radiation) are used by IR cameras to provide thermal IR images. For example, thermal IR radiation passing through an optical path of an IR camera is received by IR detectors of the FPA, which provide image data for pixels of thermal IR images.

For a scene with large temperature variations, it may be impossible to capture the full span of the high intra-scene temperature range with a single exposure of an IR camera. If the IR camera is optimized for lower irradiance, the high irradiance areas (e.g., the hottest areas) will often be saturated. If the IR camera is optimized for higher irradiance, the low irradiance areas (e.g., the cooler areas) may become noisy and appear black.

For a particular IR camera and expected temperature range, imaging may be optimized by adjusting the camera to an optimal shutter speed or integration time. However, it may not be possible to fully encompass a scene's temperature variations using a single integration time.

SUMMARY

In one or more embodiments, a device includes a first thermal infrared (IR) imaging module configured to capture a first image for a first field of view (FOV); a second thermal IR imaging module configured to capture a second image for a second FOV overlapping, at least in part, with the first FOV, the second thermal IR imaging module optimized for higher thermal IR irradiance than the first thermal IR imaging module; and a processing system configured to detect saturated pixels (e.g., saturated pixel values and/or saturated pixel coordinates) of the first image, determine pixels (e.g., pixel values and pixel coordinates) of the second image corresponding to the saturated pixels of the first image, and generate a combined image based on non-saturated pixels (e.g., non-saturated pixel values and/or non-saturated pixel coordinates) of the first image and the pixels (e.g., pixel values and pixel coordinates) of the second image corresponding to the saturated pixels of the first image. The first thermal IR imaging module and the second thermal IR imaging module may be mechanically and electronically integrated. The processing system may be configured to register the first image and the second image to a common image plane, which may have a spatial resolution that is different from the spatial resolution of the first image and/or the second image. The processing system may be configured to perform tone mapping and/or automatic gain control (AGC) after the generation of the combined image.

In some embodiments, the first thermal IR imaging module includes a first microbolometer focal plane array (FPA) configured for high-gain, and the second thermal IR imaging module includes a second microbolometer FPA configured for low-gain to optimize for higher thermal IR irradiance.

In some embodiments, the first thermal IR imaging module includes a photon detector FPA using an integration time to optimize for lower IR irradiance than the second thermal IR imaging module, and the second thermal IR imaging module includes a microbolometer FPA. The photon detector FPA may be sensitive to mid-wave IR radiation (MWIR), and the microbolometer FPA may be sensitive to long-wave IR radiation (LWIR). The processing system may be configured to determine an absolute temperature of an object based on radiometric information captured by the photon detector FPA and the microbolometer FPA.

In some embodiments, the first thermal IR imaging module has a different spatial resolution than the second thermal IR imaging module, and the processing system is configured to resample and/or scale the first image and/or the second image to align on the common image plane. The processing system may be configured to generate the combined image by replacing the saturated pixels of the first image with pixels of the resampled second image corresponding to the saturated pixels. Alternatively, the processing system may be configured to generate the combined image by blending the saturated pixels of the first image with pixels of the resampled second image corresponding to the saturated pixels. The processing system may be configured to normalize the first image and/or the second image using the non-saturated pixels of the first image and corresponding pixels of the second image on the common image plane such that post normalization corresponding scene coordinates in first and second image provide signal intensity values that are the same or similar.

In some embodiments, the first thermal IR imaging module has a higher spatial resolution than the second thermal IR imaging module, and the processing system is configured to resample and/or scale pixels of the second image corresponding to the saturated pixels of the first image to align with the saturated pixels on the common image plane. The processing system may be configured to normalize the saturated pixels (e.g., saturated pixel values) of the first image and/or the pixels (e.g., pixel values) of the second image corresponding to the saturated pixels of the first image using the non-saturated pixels (e.g., non-saturated pixel values) of the first image and corresponding pixels (e.g., pixel values) of the second image on the common image plane. The processing system may be configured to generate the combined image by replacing the saturated pixels of the first image with the resampled, scaled, and/or normalized pixels (e.g., resampled, scaled, and/or normalized pixel values) based on the second image. Alternatively, the processing system may be configured to generate the combined image by blending the saturated pixels of the first image with the resampled, scaled, and/or normalized pixels.

In one or more embodiments, a method includes capturing a first thermal image for a first FOV; capturing, concurrently with the capturing of the first thermal image, a second thermal image for a second FOV overlapping, at least in part, with the first FOV, wherein the capturing of the second thermal image is optimized for higher thermal infrared (IR) irradiance than the capturing of the first thermal image; detecting saturated pixels of the first thermal image; determining pixels of the second thermal image corresponding to the saturated pixels of the first thermal image; and generating a combined image based on non-saturated pixels of the first thermal image and the pixels of the second thermal image corresponding to the saturated pixels of the first thermal image. The method may further include registering the first thermal image and the second thermal image to a common image plane. The common image plane may have a spatial resolution that is different from the spatial resolution of either first or second image. The method may further include performing tone mapping and/or AGC after the generating of the combined image.

In some embodiments, the first thermal image is captured with a first IR imaging module comprising a first microbolometer FPA configured for high-gain, and the second thermal image is captured with a second IR imaging module comprising a second microbolometer FPA configured for low-gain to optimize for higher thermal IR irradiance.

In some embodiments, the first thermal image is captured with a first IR imaging module comprising a photon detector FPA, the second thermal image is captured with a the second IR imaging module comprising a microbolometer FPA. The first imaging module may use an integration time to optimize the first imaging module for lower thermal IR irradiance than the second thermal imaging module. The photon detector FPA may be sensitive to MWIR, and the microbolometer FPA may be sensitive to LWIR. The method may further include determining an absolute temperature of an object based on radiometric information captured by the photon detector FPA and the microbolometer FPA.

In some embodiments, the first image has a higher spatial resolution than the second image, and the method further includes resampling the second thermal image to align with the first thermal image on the common image plane. The method may further include generating the combined image by replacing the saturated pixels of the first thermal image with pixels of the resampled second thermal image corresponding to the saturated pixels. Alternatively, the method may further include generating the combined image by blending the saturated pixels of the first thermal image with pixels of the resampled second thermal image corresponding to the saturated pixels.

In one or more embodiments, a device includes an IR imaging module configured to capture a first image using a first imaging mode of a plurality of imaging modes and a second image using a second imaging mode of the plurality of imaging modes, where the first imaging mode is different from the second imaging mode. The device further includes a processing system configured to detect saturated pixels of the first image, determine pixels of the second image corresponding to the saturated pixels of the first image, and generate a combined image based on non-saturated pixels of the first image and the pixels of the second image corresponding to the saturated pixels of the first image. In some embodiments, the first imaging mode is associated with a different integration time than the second imaging mode.

The scope of the invention is defined by the claims. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the invention and their advantages are best understood by referring to the detailed description that follows. It should be appreciated that like reference numerals are used to identify like elements illustrated in one or more of the figures.

DETAILED DESCRIPTION

Figure 1:
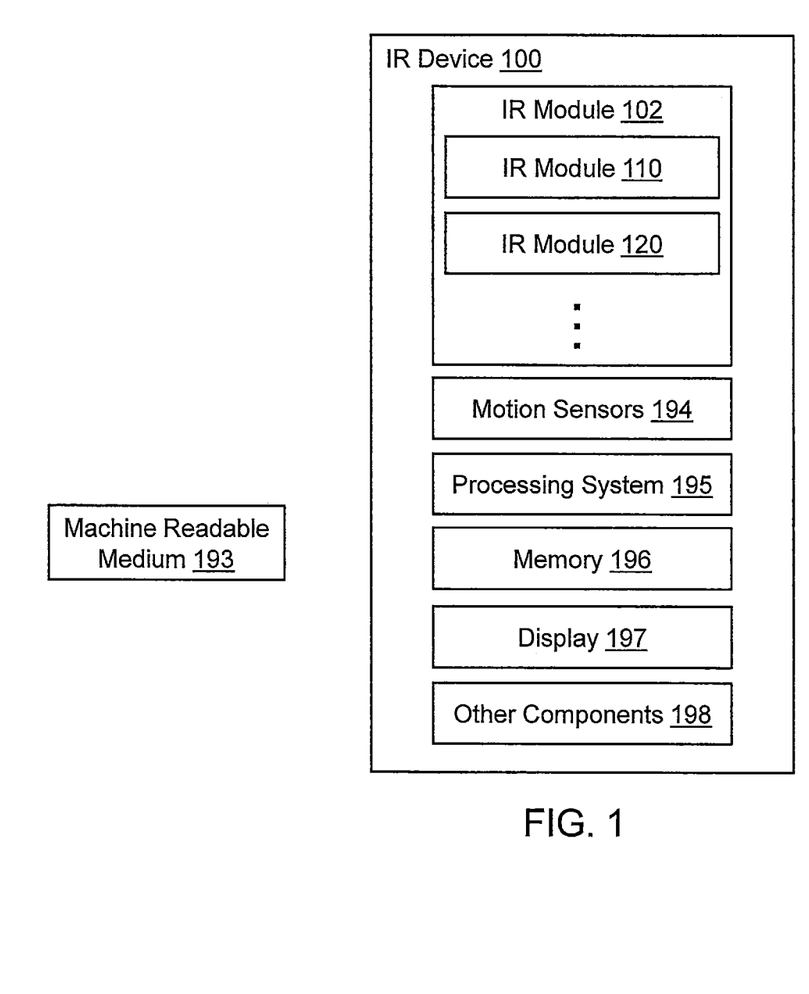
FIG. 1 illustrates an exemplary infrared (IR) imaging device including IR imaging modules in accordance with an embodiment of the invention.

FIG. 1 illustrates a block diagram of an infrared (IR) imaging device 100 (e.g., a thermal IR imaging device) in accordance with an embodiment of the invention. IR imaging device 100 includes an IR imaging module 110 (e.g., a thermal IR imaging module), an IR imaging module 120 (e.g., a thermal IR imaging module), processing system 195 (e.g., a processor), motion sensors 194, a machine readable medium 195, a memory 196, a display 197, and/or other components 198.

In various embodiments, IR imaging module 110 and 120 are each equipped with a microbolometer FPA or a photon detector FPA. A microbolometer FPA detects IR radiation using thermal detectors of the FPA, which provide image data for pixels of thermal IR images. Microbolometer FPAs may have lower sensitivities, a broader temperature range (e.g., a larger dynamic range), and/or a higher temperature range. Microbolometer FPAs may include IR detecting materials such as amorphous silicon (a-Si), vanadium oxide ($VO_x$), or other detecting material. Microblometer FPAs usually do not require cooling, so IR cameras equipped with microbolometer FPAs are often uncooled IR cameras.

A photon detector FPA detects IR radiation using photon detectors of the FPA, which provide image data for pixels of thermal IR images. Photon detector FPAs may include IR detecting materials such as indium gallium arsenide (In-GaAs), indium antimonide (InSb), indium arsenide (InAs), germanium, or other detecting material, and may include quantum well infrared photodetectors (QWIP). Photon detector FPAs may have higher sensitivities, a narrower temperature range (e.g., a smaller dynamic range), and/or a lower temperature range. Photon detector FPAs usually require cooling, so photon detector FPA cameras are often cooled IR cameras.

In certain embodiments, both IR imaging module 110 and IR imaging module 120 each include a microbolometer FPA. IR imaging module 110 may be an uncooled IR imaging module including a microbolometer FPA configured for high-gain (e.g., higher gain than IR imaging module 120). IR imaging module 110 may be configured for high-gain, for example, through calibration (e.g., by adjusting output signal gain and/or offset). IR imaging module 110 operated in high-gain mode captures image data for a narrower temperature range (e.g., a smaller dynamic range) than IR imaging module 120, and may provide the best possible signal to noise ratio (SNR) for an irradiance/temperature range that is most likely to be of interest to an operator. For example, the irradiance/temperature range of interest may be around the irradiance/temperature levels typical for human skin at body temperature).

IR imaging module 120 may be an uncooled IR imaging module including a microbolometer FPA optimized for wider irradiance/temperature range. For example, IR imaging module 120 may be configured for low-gain (e.g., lower-gain than IR imaging module 110). IR imaging module 120 may be configured for low-gain mode, for example, through calibration (e.g., by adjusting output signal gain and/or offset) and/or by signal attenuation using a grey filter. IR imaging module 120 operated in low-gain mode captures image data for a broader temperature range (e.g., a larger dynamic range) and/or a higher temperature range than IR imaging module 110, thereby sacrificing signal to noise ratio for increased dynamic range.

In other embodiments, IR imaging module 110 includes a photon detector FPA and IR imaging module 120 includes a microbolometer FPA. IR imaging module 110 may be a cooled IR imaging module including a photon detector FPA. IR imaging module 110 may have an integration time that can be changed to accommodate scenes at varying irradiance/temperature levels. Using a longer integration time may optimize the cooled IR imaging module for a narrower temperature range (e.g., a smaller dynamic range) and/or a lower temperature range, as detectors of the FPA receiving radiation from high irradiance/temperature areas (e.g., objects with large temperatures) will be saturated. Using a shorter integration time may optimize IR imaging module 110 for a broader temperature range (e.g., larger dynamic range) and/or a higher temperature range, as the detectors of the FPA receiving radiation from the objects with the large temperatures may not be saturated, but the low irradiance areas (e.g., objects with low temperatures) may not have sufficient signal to noise ratio. The IR image for areas with insufficient signal to noise ratio may appear black when displayed.

IR imaging module 110 may be a cooled IR imaging module including a photon detector FPA optimized for a low irradiance/temperature by using a specified integration time (e.g., a long integration time). The specified integration time of IR imaging module 110 may be set such that IR imaging module 110 provides the best possible signal to noise ratio for an irradiance/temperature range that is most likely to be of interest to an operator (e.g., a low irradiance/temperature time). For example, the irradiance/temperature range of interest may be around the irradiance/temperature levels typical for human skin at body temperature. IR imaging module 110 configured with the specified integration time may capture image data for a narrower temperature range (e.g., a smaller dynamic range) and/or a lower temperature range than IR imaging module 120. IR imaging module 110 may further be configured for high-gain, for example, through calibration.

IR imaging module 120 may be an uncooled IR imaging module including a microbolometer FPA optimized for higher irradiance/temperature. As microbolometer FPAs usually perform well under high irradiance/temperature conditions, IR imaging module 120 may be optimized for a higher irradiance/temperature. IR imaging module 120 may capture image data for a broader temperature range (e.g., a larger dynamic range) and/or a higher temperature range than IR imaging module 110. IR imaging module 120 may further be configured for low-gain, for example, through calibration and/or by signal attenuation using a grey filter.

In various embodiments, the field of view (FOV) of IR imaging module 110 overlaps, at least in part, with the FOV of IR imaging module 120. Thus, an image captured by IR imaging module 110 overlaps, at least in part, with an image captured by IR imaging module 120.

In various embodiments, IR imaging module 110 has a different resolution than IR imaging module 120. In some embodiments, IR imaging module 110 has a higher spatial resolution than IR imaging module 120. In other embodiments, IR imaging module 110 may have the same spatial resolution than IR imaging module 120. In further embodiments, IR imaging module 120 has a higher spatial resolution than IR imaging module 110.

In various embodiments, IR imaging module 120 may be mechanically and/or electrically integrated with IR imaging module 110 and/or connected to IR imaging module 110, forming a combined IR imaging module 102. In other embodiments, IR imaging module 110 and IR imaging module 120 are provided as a separate element. IR imaging module 110 and IR imaging module 120 may be positioned on IR imaging device 100 such that they are optically aligned and respective field of views match. However, the optical alignment and field of view matching may be approximate as processing system 195 may align/match images captured by IR imaging module 110 and IR imaging module 120 onto a common image plane, as discussed below.

In further embodiments, there may be additional IR imaging modules. For example, an additional IR imaging module may be an uncooled IR imaging module equipped with a microbolometer FPA configured for medium-gain.

Motion sensors 194 may be implemented by one or more accelerometers, gyroscopes, or other appropriate devices that may be used to detect movement of IR imaging device 100. Motion sensors 194 may be monitored by and provide information to processing system 195 to detect motion. In various embodiments, motion sensors 194 may be implemented as part of IR imaging device 100, IR imaging module 110, IR imaging module 120, or other devices attached to or otherwise interfaced with IR imaging device 100.

Processing system 195 may be implemented as any appropriate processing device (e.g., logic device, microcontroller, processor, application specific integrated circuit (ASIC), programmable logic device (PLD), or other device) that may be used by IR imaging device 100 to execute appropriate instructions, such as software instructions provided in memory 196.

In various embodiments, processing system 195 is configured to simultaneously operate IR imaging module 110 to capture an image and operate IR imaging module 120 to capture an additional image. Processing system 195 may be configured to register (e.g., align, match, and/or correct for parallax) the image of IR imaging module 110 and the additional image of IR imaging module 120 to a common image plane, such that for every location on the common image plane, the signal from IR imaging module 110 and the signal from IR imaging module 120 are known. As input pixel locations (e.g., input pixel coordinates) of the image and input pixel locations (e.g., input pixel coordinates) of the additional image may not align on the common image plane, the additional image of IR imaging module 120 may be resampled, interpolated, and/or aligned so that the output pixel locations (e.g., output pixel coordinates) of the additional image aligns with output pixel locations (e.g., output pixel coordinates) of the image on the common image plane. The image of IR imaging module 110 may also be resampled and/or interpolated, for example, in accordance with the specification of display 197 (e.g., the resolution of display 197). Processing system 195 may display a generated combined image as output on display 197. Accordingly, output pixel locations for the image and corresponding output pixel locations for the additional image on display 197 are aligned such that they represent the same (or approximately the same) scene, object in the scene, and/or area in the FOV.

Processing system 195 may be configured to normalize the image (e.g., saturated pixel values of the image) and/or the additional image (e.g., pixel values of the additional image corresponding to the saturated pixel values of the image) using the non-saturated pixels (e.g., non-saturated pixel values) of the image and optically corresponding pixels (e.g., pixel values) of the additional image (e.g., corresponding pixels of the additional image on the common image plane) before the generation of the combined image. For example, in overlapping areas (e.g., where both signals/image data from IR imaging module 110 and IR imaging module 120 are known), areas where neither signal is saturated may be identified. This provides multiple samples of the same scene or object in the scene as captured by two different sensors. The two signals/image data can be normalized to the same range by applying a gain and/or offset adjustment to at least one of the signals/image data such that one or more corresponding scene coordinates/areas in the image and the additional image provide signal intensity values that are the same or similar after normalization. The gain and offset may be global parameters (each pixel is multiplied by the same gain and the same offset added) or the gain and offset may be determined locally, such as when the irradiance response is locally varying.

Processing system 195 may be configured to detect saturated pixels (e.g., saturated pixel values and/or saturated pixel coordinates) of the image, determine pixels (e.g., pixel values and pixel coordinates) of the additional image corresponding to the saturated pixels of the image, and generate a combined image based on non-saturated pixels (e.g., non-saturated pixel values and/or non-saturated pixel coordinates) of the image and the pixels (e.g., pixel values and pixel coordinates) of the additional image corresponding to the saturated pixels of the image. Processing system 195 may generate the combined image by using image data of pixels from IR imaging module 110 in all areas where the signal/image data from IR imaging module 110 is not saturated, and using resampled and normalized image data of pixels from IR imaging module 120 in all other areas. Advantageously, this combination of IR imaging module 110 and IR imaging module 120 provides a high dynamic range imaging capability while preserving high signal fidelity in a specified irradiance range.

In various embodiments, IR imaging module 110 and IR imaging module 120 may concurrently capture respective images, for example, at their respective frame-rate, in contrast to using a single IR imaging module to sequentially (e.g., in successive frames) capture images of different irradiances or dynamic range. For example, the image of IR imaging module 110 and the additional image of IR imaging module 120 may be captured at the same time or substantially the same time (e.g., accounting for delay in electronic processing or different frame-rates of respective IR imaging modules). This may advantageously allow for simpler read-out circuitry and/or avoid registration issues when trying to combine images captured at different points in time.

In various embodiments, IR imaging module 110 has a different spatial resolution than IR imaging module 120, and processing system 195 is configured to resample, interpolate, extrapolate, stretch, shrink, and/or crop the image of IR imaging module 110 and/or the additional image of IR imaging module 120 to register (e.g., align, match, and/or correct for parallax) the image of IR imaging module 110 and the additional image of IR imaging module 120 on the common image plane.

In certain embodiments, IR imaging module 110 has a higher spatial resolution than IR imaging module 120, and processing system 195 is configured to resample, interpolate, extrapolate, stretch, shrink, and/or crop the additional image of IR imaging module 120 to register (e.g., align, match, and/or correct for parallax) the image of IR imaging module 110 on the common image plane. Processing system 195 may be configured to generate the combined image by replacing the saturated pixels (e.g., saturated pixel values) of the image with pixels (e.g., pixel values) of the interpolated additional image corresponding to the saturated pixels of the image on the common image plane. Alternatively, processing system 195 may be configured to generate the combined image by blending the saturated pixels of the image with pixels of the interpolated additional image corresponding to the saturated pixels of the image on the common image plane.

Processing system 195 may further perform tone mapping, image enhancement (e.g., digital detail enhancement (DDE)) and/or automated gain control (AGC) after the generation of the combined image. Performing image enhancement and/or AGC on the combined image is advantageous because performing image enhancement and/or AGC on the image of IR imaging module 110 with saturated pixels causes non-saturated pixels to be over-corrected. During the generation of the combined image, saturated pixels of the image of IR imaging module 110 are excluded and, thus, performing image enhancement and/or AGC on the combined image solves the problem of over-correction.

Embodiments in which IR imaging device 100 includes uncooled IR imaging module 110 and uncooled IR imaging module 120 each equipped with a microbolometer FPA is advantageous as the dynamic range of IR imaging device 100 may be increased. Uncooled IR imaging module 110 may be operated in a higher gain in its standard high-gain mode compared to when operating only one uncooled IR imaging module, since uncooled IR imaging module 120 may be relied upon to capture low-gain images to supplement the images captured by uncooled IR imaging module 110. Thus, IR imaging device 100 may provide better signal to noise ratio. Further, uncooled IR imaging module 110 and/or uncooled IR imaging module 120 may be designed ground-up to be optimized only for a narrow dynamic range (e.g., 1-40 degrees Celsius), which may reduce the cost of IR imaging devices with such a large dynamic range. IR imaging device 100 may further include an additional uncooled IR imaging module configured for medium-gain to further increase the dynamic range.

Embodiments in which IR imaging device 100 includes cooled IR imaging module 110 equipped with a photon detector FPA and uncooled IR imaging module 120 equipped with a microbolometer FPA is similarly advantageous as the dynamic range of IR imaging device 100 may be increased. Although the integration time of cooled IR imaging module 110 may be used to improve the dynamic range, such as by capturing multiple images with varying integration times sequentially and combining such images (e.g., using techniques such as superframing), this requires more complex readout circuitry and also causes registration issues when trying to recombine images captured at different points in time compared to using cooled IR imaging module 110 and uncooled imaging module 120 together, as described above. By optimizing cooled IR imaging module 110 for low irradiance (e.g., longer integration time) only, readout integrated circuit (ROIC) design may be simpler and allow for optimal image performance when dealing with low contrast targets (e.g., human against a background at approximately the same irradiance intensity as the human). Further, by optimizing uncooled imaging module 120 for high irradiance only, wider FOV lenses than can be normally used with uncooled technology may be used with uncooled imaging module 120, which may allow uncooled imaging module 120 to better match the field of view of cooled IR infrared imager 110, as many cooled imaging applications are focused on imaging at long distances using a narrow field of view optic. IR imaging device 100 may further include an additional uncooled IR imaging module to further increase the dynamic range.

In some embodiments in which IR imaging device 100 includes cooled IR imaging module 110 equipped with a photon detector FPA and uncooled IR imaging module 120 equipped with a microbolometer FPA, cooled IR imaging module 110 is sensitive to mid-wave IR radiation (MWIR) (e.g., electromagnetic radiation in the 2-5 micrometer (μm) waveband) and uncooled IR imaging module 120 is sensitive to long-wave IR radiation (LWIR) (e.g., electromagnetic radiation in the 7-12 micrometer (μm) waveband). This allows for "dual color" applications in the overlapping non-saturated areas of the scene. IR imaging device 100 may advantageously have improved accuracy in determining radiometric data, such as remote absolute temperature sensing, since deviations from a blackbody radiation power spectrum may be better approximated. Accordingly, processing system 195 may be configured to remotely determine an absolute temperature of an object based on radiometric data recorded by IR imaging module 110 in response to IR imaging module 110 capturing radiation emitted from the object, and additional radiometric data recorded by IR imaging module 120 in response to IR imaging module capturing radiation emitted from the object.

Display 197 may be used to display captured and/or processed IR images and/or other images, data, and/or information. Other components 198 may be used to implement any features of IR imaging device 100 as may be desired for various applications (e.g., clocks, temperature sensors, a visible light camera, or other components). In addition, a machine readable medium 193 may be provided for storing non-transitory instructions for loading into memory 196 and execution by processor 195.

Figure 2A:
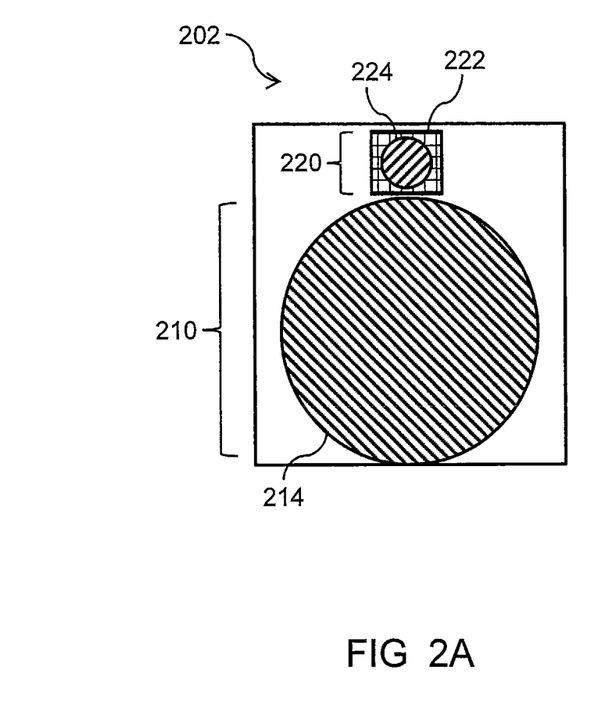
FIGS. 2A-B illustrate exemplary IR imaging modules of an IR imaging device in accordance with an embodiment of the invention.
Figure 2B:
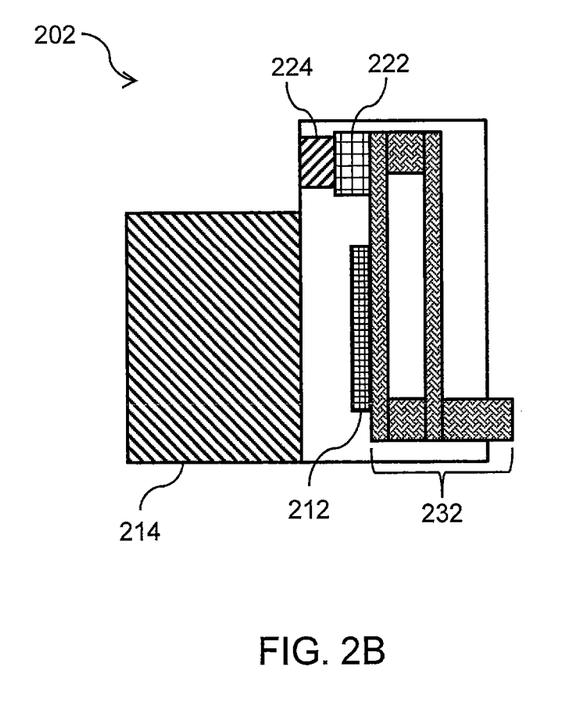

FIGS. 2A-B illustrate exemplary IR imaging modules of an IR imaging device in accordance with an embodiment of the invention. IR imaging module 210, such as IR imaging module 110 (in FIG. 1), and IR imaging module 220, such as IR imaging module 120 (in FIG. 1), may be located in close proximity to each other. IR imaging modules 210 and 220 may be mechanically and/or electrically integrated and/or coupled as combined IR imaging module 202, such as combined IR imaging module 102 (in FIG. 1).

IR imaging module 210 includes optics 214 and a sensor 212, and IR imaging module 220 includes optics 224 and a sensor 222. Combined IR imaging module 202 includes electronics 232, which may be shared by IR imaging module 210 and 220. Electronics 232 may include video pipeline, field-programmable gate array (FPGA), and/or other hardware components. For example, electronics of an IR imaging camera configured for use with IR imaging module 210 may be modified to also connect with IR imaging module 220, and the firmware of the IR imaging camera may be modified for use with both IR imaging modules 210 and 220.

In an embodiment, sensor 212 is a microbolometer FPA, and sensor 222 is another microbolometer FPA. IR imaging module 210 may be configured for high-gain and IR imaging module 220 may be configured for low-gain. Sensor 212 may have a higher spatial resolution than sensor 222, for example, by having more pixels in the array.

In other embodiments, sensor 212 is a photon detector FPA and sensor 222 is a microbolometer FPA. Sensor 212 may have a higher spatial resolution than sensor 222, for example, by having more pixels in the array. Alternatively, sensor 212 may have the same spatial resolution as sensor 222.

In further embodiments, combined IR imaging module 202 may further include one or more additional IR imaging modules each including its own optics and a sensor, and the one or more additional IR imaging modules may also be coupled with, and share, electronics 232.

Figure 3:
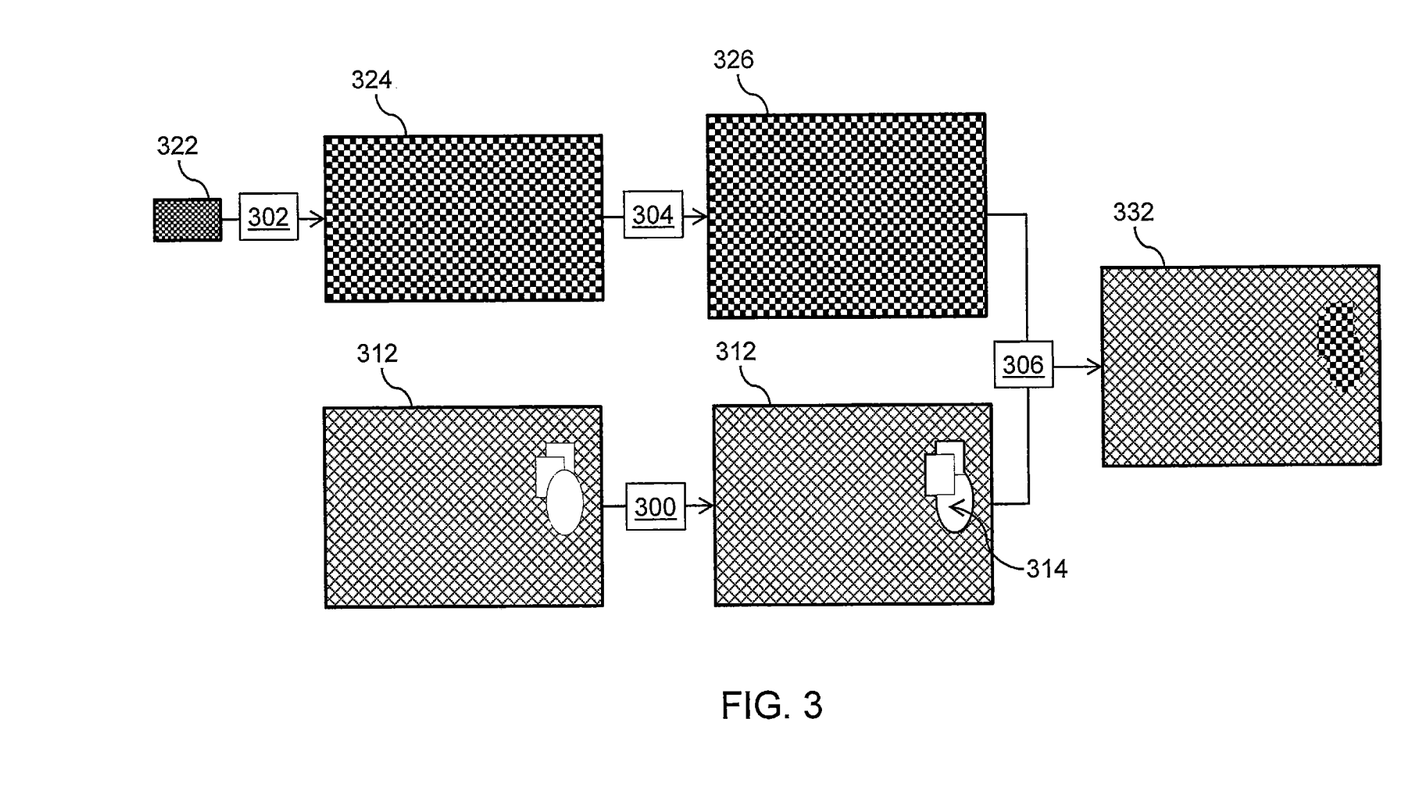
FIG. 3 illustrates an exemplary method of generating a combined image captured by IR imaging modules in accordance with an embodiment of the invention.

FIG. 3 illustrates an exemplary method of generating a combined image captured by IR imaging modules in accordance with an embodiment of the invention. Image 312 is an image captured by an IR imaging module with a higher spatial resolution and optimized for lower thermal IR irradiance, such as IR imaging module 110 (in FIG. 1). Image 322 is an image captured by an IR imaging module with a lower spatial resolution and optimized for higher thermal IR irradiance, such as IR imaging module 120 (in FIG. 1).

IR imaging module 110 may capture image 312 of a scene in its field of view that includes an object that has a high irradiance/temperature. Because IR imaging module 110 is optimized for lower irradiance, the object may cause pixels representing the object in the field of view to be saturated.

At block 300, saturated pixels, such as pixels 314, of image 312 may be detected, as represented by the black outline in FIG. 3.

IR imaging module 120 may capture image 322 that has a lower spatial resolution than image 312. Because IR imaging module 120 is optimized for higher irradiance than IR imaging module 110, the object that caused saturated pixels 314 may not cause pixels of image 322 to saturate. However, because the respective resolutions of images 312 and 322 are different, image 322 may be processed so that it can be combined with image 312.

At block 302, image 322 is scaled to an image 324 having increased spatial resolution. Spatial resolution may be increased by resampling, interpolation, and/or extrapolation. For example, image 322 may have a resolution of 80×60 and image 324 may have a resolution of 320×240.

At block 304, image 324 is further processed to register image 326 and image 312 in a common image plane by stretching, shrinking, and/or cropping. For example, image 312 may have a resolution of 320×256. Image 324 with a resolution of 320×240 may be processed to image 326 with a resolution of 320×256 to match the resolution of image 312.

At block 306, image 312 is combined with image 326 to generate a combined image 332. In many embodiments, saturated pixels 314 of image 312 are replaced by optically corresponding pixels of image 326 (e.g., corresponding pixels of image 326 on the common image plane). Accordingly, image 332 includes non-saturated pixels of image 312 and select pixels of image 326 that correspond to the saturated pixels of image 312. In other embodiments, saturated pixels 314 of image 312 are blended with optically corresponding pixels of image 326.

Figure 4A:
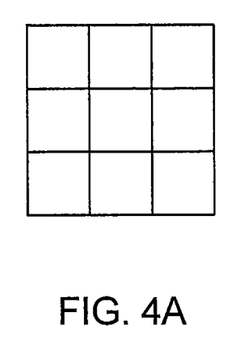
FIGS. 4A-B illustrates an exemplary comparison of instantaneous field of view in accordance with an embodiment of the invention.
Figure 4B:
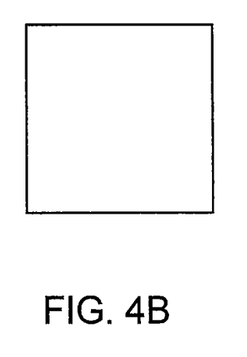

FIGS. 4A-B illustrates an exemplary comparison of instantaneous field of view (IFOV) in accordance with an embodiment of the invention. FIG. 4A shows pixels of an IR imaging module, such as IR imaging module 110 (in FIG. 1), that has a higher spatial resolution and a smaller IFOV, while FIG. 4B shows a pixel of an IR imaging module, such as IR imaging module 120 (in FIG. 1), that has a lower spatial resolution and a larger IFOV. For the same area, pixels (e.g., pixels of the FPA detectors and/or pixels of image data stored in a memory, and/or pixels displayed on a display) of IR imaging module 110 are smaller than pixels of IR imaging module 120. For example, IR imaging module 110 may have a IFOV of 0.11 degrees, while IR imaging module 120 has a IFOV of 0.33 degrees. Because the ratio between the IFOV of IR imaging module 110 and IR imaging module 120 is 1:3, IR imaging module 110 has 9 (3×3) times as many pixels than IR imaging module 120, as shown in FIG. 4A-B.

Figure 5:
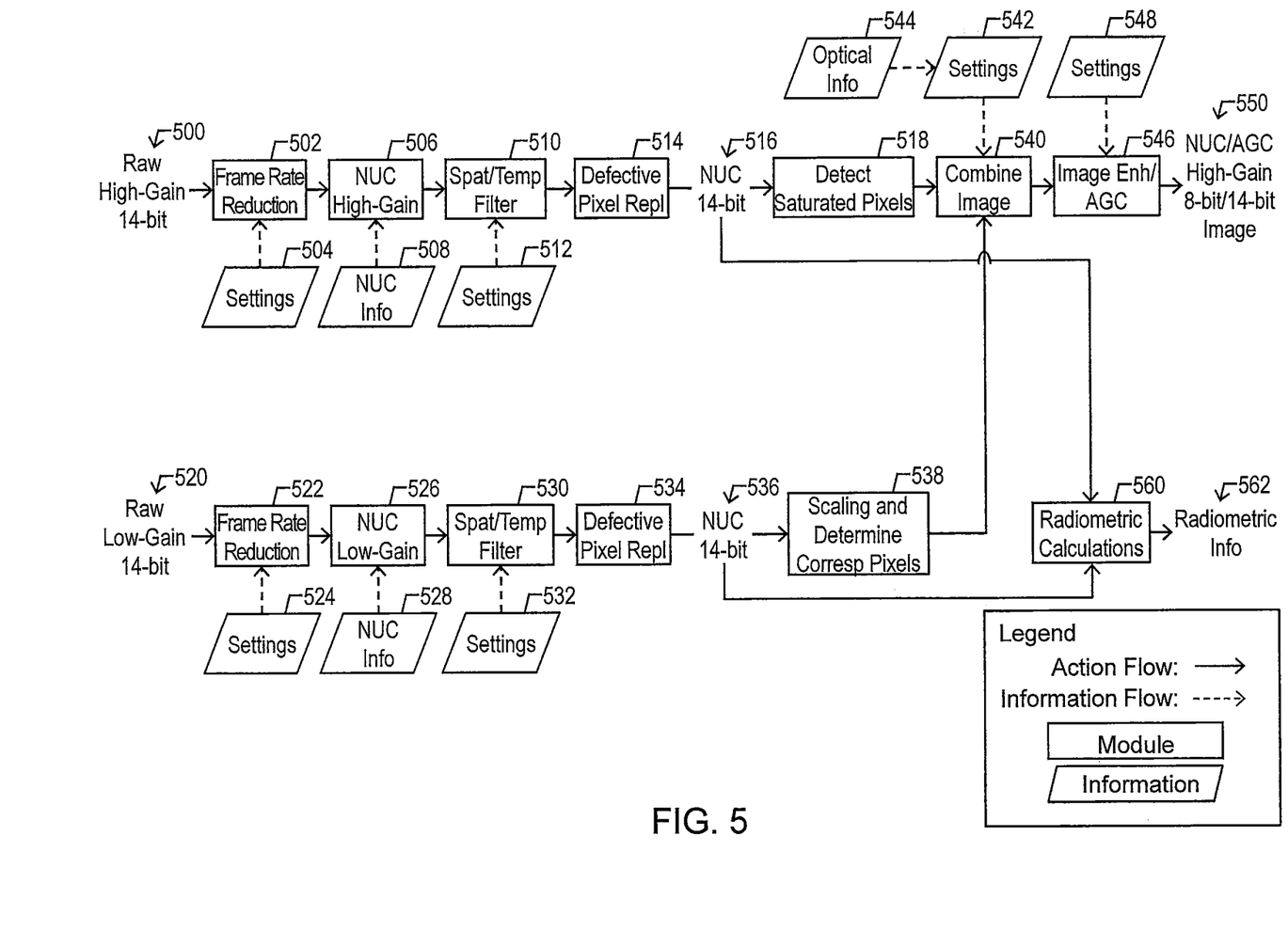
FIG. 5 illustrates an exemplary flow diagram for generating a combined image based on images captured by IR imaging modules in accordance with an embodiment of the invention.

FIG. 5 illustrates an exemplary flow diagram for generating a combined image based on images captured by IR imaging modules in accordance with an embodiment of the invention. An IR imaging module optimized for lower irradiance/temperature range, such as IR imaging module 110 (in FIG. 1), may capture images 500 (e.g., images, image data and/or information, pixel data and/or information, etc.), such as raw high-gain 14-bit images. An IR imaging module, such as IR imaging module 120 (in FIG. 1) may capture images 520, such as raw low-gain 14-bit images. An IR imaging device, such as IR imaging device 100, may process images 500 and images 520.

At block 502, a frame rate reduction module may receive images 500 from IR imaging module 110 and, if necessary, reduce the frame rate using settings 504 stored in a memory, such as memory 196 (in FIG. 1). In an example, the frame rate reduction module may be a frame averager configured to reduce the frame rate by integrating multiple image frames to provide image frames with an improved signal to noise ratio. At block 506, non-uniformity correction (NUC) is performed on images 500 using NUC information 508 in memory 196. NUC information 508 may include NUC terms that may be specific for and/or optimized for high-gain images. At block 510, spatial filtering and/or temporal filtering may be performed on images 500 using settings 512 in memory 196. At block 514, defective pixel replacement may be performed on images 500. Accordingly, images 500 may be processed to generate images 516, such as non-uniformity corrected high-gain 14-bit images.

At block 522, a frame rate reduction module may receive images 520 from IR imaging module 120 and, if necessary, reduce the frame rate using settings 524 stored in a memory, such as memory 196 (in FIG. 1). In an example, the frame rate reduction module may be a frame averager configured to reduce the frame rate by integrating multiple image frames to provide image frames with an improved signal to noise ratio and/or to match the frame rate of images 500 of IR imaging module 110 or images 500 averaged at block 502. At block 526, non-uniformity correction (NUC) is performed on images 520 using NUC information 528 in memory 196. NUC information 528 may include NUC terms that may be specific for and/or optimized for low-gain images. At block 530, spatial filtering and/or temporal filtering may be performed on images 520 using settings 532 in memory 196. At block 534, defective pixel replacement may be performed on images 520. Accordingly, images 520 may be processed to generate images 536, such as non-uniformity corrected low-gain 14-bit images.

At block 518, saturated pixels of images 516 may be detected, for example, as described above in relation to block 300 of FIG. 3. At block 538, images 536 may be scaled (e.g., by resampling, interpolation, extrapolation, stretching, shrinking, and/or cropping) to align with images 516 on a common image plan, for example, as described in relation to blocks 302 and 304 of FIG. 3. Further, pixels of images 536 corresponding to the saturated pixels of images 516 may be determined, for example, as described in relation to block 306 of FIG. 3. At block 540, images 516 and images 536 may be combined to generate a combined image using settings 542 stored in memory 196, which may be based, at least in part, on optical information 544. In various embodiments, images 516 and images 536 are combined by replacing the saturated pixels of images 516 with the pixels of images 536 that correspond to the saturated pixels of images 516 to generate the combined images. In other embodiments, images 516 and images 536 are blended to generate the combined images.

At block 546, further processing of the combined images may be performed, such as image enhancement and automatic gain control/compensation (AGC). Accordingly, images 516 and images 536 are processed to generate output images 550, such as non-uniformity corrected and automatic gain compensated high-gain 8-bit or 14-bit images.

At block 560, radiometric information contained in images 516 and images 536 are used to perform radiometric calculations to provide radiometric information 562, such as absolute radiometric values (e.g., an absolute temperature).

Some or all of blocks 502, 506, 510, 514, 516, 518, 540, 546, 522, 526, 530, 534, 538, and/or 560 may each be performed by a respective software or hardware module configured to perform the operation of each block described above.

Blocks 518, 538, 540, 546, and 560 may be performed by a processing system of IR imaging device 100, such as processing system 195 in FIG. 1, and are further described above in relation to FIGS. 1 and 3.

Frame averager, non-uniformity correction, spatial filtering, temporal filtering, defective pixel replacement, detection of saturated pixels, combining images, blending images, image enhancement, automatic gain control/compensation, and determining absolute radiometric values described in blocks 502-514, 518, 522-534, 538-548, and 560 are further described in U.S. Patent Application Publication No. 2014/0092257 entitled "Non-uniformity correction techniques for infrared imaging devices," published Apr. 3, 2014, U.S. Pat. No. 7,995,859 entitled "Scene based non-uniformity correction systems and methods," published Aug. 9, 2011, U.S. Patent Application publication No. 2014/0139685 entitled "Low power and small form factor infrared imaging," published May 22, 2014, U.S. Patent Application Publication No. 2014/0037225 entitled "Row and column noise reduction in thermal images," published Feb. 6, 2014, U.S. Pat. No. 7,606,484 entitled "Infrared and near-infrared camera hyperframing," published Oct. 20, 2009, U.S. Patent Application Publication No. 2014/0355904 entitled "Image processing method for detail enhancement and noise reduction," published Dec. 14, 2014, and U.S. Patent Application Publication No. U.S. 2014/0232875 entitled "Determination of an absolute radiometric value using blocked infrared sensors," published Aug. 21, 2014, all of which are incorporated herein by reference in their entirety.

Figure 6:
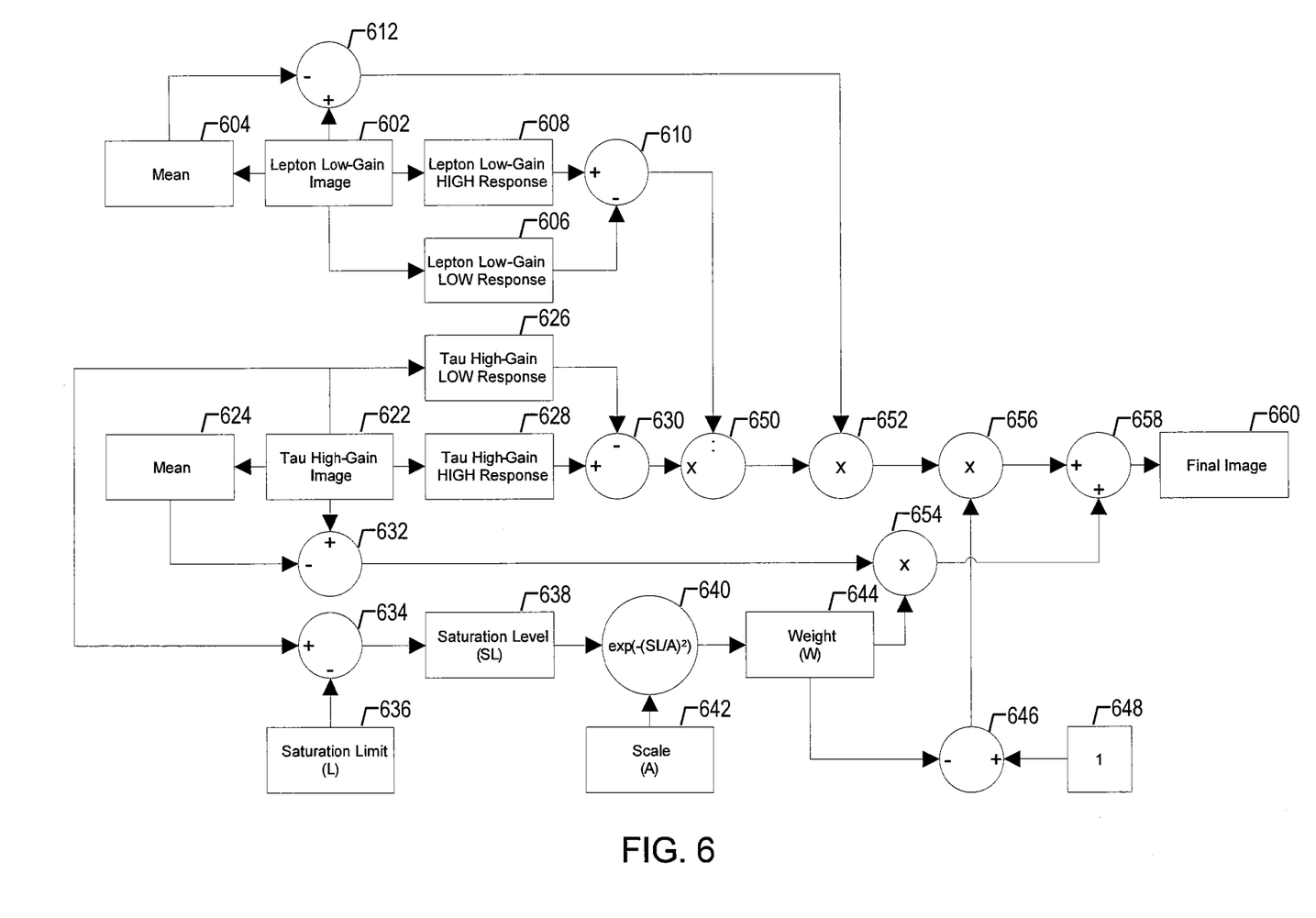
FIG. 6 illustrates an exemplary flow diagram for generating a combined image based on images captured by IR imaging modules in accordance with an embodiment of the invention.

FIG. 6 illustrates an exemplary flow diagram for generating a combined image based on images captured by IR imaging modules in accordance with an embodiment of the invention. For example, the flow diagram of FIG. 6 may be an implementation of blocks 518, 538, and/or 540 of FIG. 5.

In various embodiments, an IR imaging module optimized for higher thermal IR irradiance, such as IR imaging module 120 (in FIG. 1), may be, for example, a FLIR Lepton® or other suitable IR imaging camera/module/core configured to always run in low-gain mode. As shown in block 602, IR imaging module 120 may capture a low-gain image. As shown in block 604, a mean output of IR imaging module 120 may be reported on every frame. Low response 606 in the low-gain image is subtracted from high response 608 based on pre-determined maximum and minimum response limits to provide a dynamic range in the response of IR imaging module 120 (low-gain dynamic range), as shown in block 610. At block 612, the mean output is subtracted from the low-gain image on a per pixel basis to normalize the low-gain image.

In various embodiments, an IR imaging module optimized for lower thermal IR irradiance, such as IR imaging module 110 (in FIG. 1), may be, for example, a FLIR Tau® or other suitable high resolution IR imaging camera/module/core configured to always run in high-gain mode. As shown in block 622, IR imaging module 110 may capture a high-gain image. As shown in block 624, a mean output is reported in every frame. Low response 626 in the high-gain image is subtracted from high response 628 based on pre-determined maximum and minimum response limits to provide a dynamic range in the response of IR imaging module 110 (high-gain dynamic range), as shown in block 630. At block 632, the mean output is subtracted from the high-gain image on a per pixel basis to normalize the high-gain image.

In various embodiments, whether to use high-gain information (e.g., pixel data of high-gain image) or low-gain information (e.g., pixel data of low-gain image) is determined on a per pixel basis. At block 634, available dynamic range is determined relative to the high-gain saturation limit/threshold 636 on a per pixel basis. Pixels within the available dynamic range may be determined by determining whether each pixel is within the saturation limit/threshold or over the saturation limit/threshold.

In some embodiments, scaling weights may be determined, for example, to be used for blending/fusion of images. At block 640, the saturation level (SL) and a scale (A) is input into the formula $\exp(-(SL/A)^2)$ to provide a weight (W) at block 644. At block 646, W is subtracted from 1 (1−W).

In various embodiments, final image processing is performed on a per pixel basis. At block 650, the ratio of the high-gain dynamic range and the low-gain dynamic range may be determined, which is multiplied to the normalized low-gain image to provide a scaled image at block 652.

In certain embodiments, the scaling weights determined at blocks 640-648 are applied, for example, to combine the images by blending/fusing. At block 654, pixels of the high-gain image are adjusted/weighted based on the scaling, for example, by multiplying W to pixels of the normalized high-gain image from block 632. At block 656, pixels of the low-gain image are adjusted/weighted based on the scaling, for example, by multiplying (1−W) to pixels of the normalized low-gain image from block 656. At block 658, the adjusted pixels of the normalized low-gain image are further adjusted based on the normalized weighted response. For example, the adjusted pixels of the normalized high-gain image from block 654 and the adjusted pixels of the normalized low-gain image from block 656 may be summed to generate the final image of block 660.

In various embodiments, in lieu of scaling the images to blend/fuse the images in blocks 638-648 and 654-658, the high-gain image and the low-gain image are combined by replacing saturated pixels of the high-gain image determined at block 634 with optically corresponding pixels of the low-gain image, as described in relation to FIGS. 1 and 3 above.

Accordingly, information of saturated pixels from IR imaging module 110 running high-gain/low dynamic range mode is replaced with, or blended/fused with, information of optically corresponding pixels from IR imaging module 120 running low-gain/high dynamic range mode. The operation described above may be done on a per-pixel basis. The final image, as a result, is a stitched image or a blended image of pixels from both IR imaging modules 110 and 120 displayed in the resolution of IR imaging module 110.

In one or more embodiments, the signal from an IR imaging module with a high dynamic range, such as IR imaging module 120, may determine the selection of the optimal integration time for another IR imaging module, such as IR imaging module 110. For example, a user may select an object that corresponds to a saturated region of an image captured using IR imaging module 110. The device or system may sample the signal corresponding to the same area in a non-saturated image captured using IR imaging module 120. There is a relationship between integration time in IR imaging module 110 and the irradiance level at which it will saturate. There is also a relationship between measured irradiance in IR imaging module 120 and corresponding irradiance in IR imaging module 110. Therefore, sampled irradiance from IR imaging module 120 may be used to determine the maximum integration time that can be used in IR imaging module 110 to avoid saturation of the user selected object/area.

Although the foregoing describes embodiments that utilize multiple IR imaging modules (e.g., 110, 120) to facilitate enhanced dynamic range IR imaging, in other embodiments a single IR imaging module may be utilized. The single IR imaging module may be a cooled or an uncooled IR imaging module. By way of non-limiting examples, the IR imaging module may include a microbolometer FPA, photon detector FPA, or generally any array of detectors configured for capture of IR image data. An integration time utilized by the single IR imaging module may be adaptively changed, such as to accommodate for possible variation of irradiance/temperature levels in imaged scenes. The integration time may be altered in accordance with a desired gain. In an aspect, a higher gain (e.g., high-gain mode) may be associated with a longer integration time and a lower gain (e.g., low-gain mode) may be associated with a shorter integration time. In this regard, the single IR imaging module may be selectively configured for high-gain or low-gain imaging mode. In some cases, the integration time of the single IR imaging module may be adaptively changed to allow more than two gain modes.

In some embodiments, a device (e.g., 100) may include a single IR imaging module (e.g., 110) and a processing system (e.g., 195). The IR imaging module may be configured to capture a first image using a first imaging mode (e.g., high-gain mode) and a second image using a second imaging mode (e.g., low-gain mode) different from the first imaging mode. In some cases, the first and second imaging modes may be associated with different integration times (e.g., longer integration time for the first imaging mode).

In some cases, integration time may be altered per line (e.g., row or column) of detectors (e.g., also referred to as pixels) of the IR imaging module. For example, odd lines of the IR imaging module may utilize an integration time associated with higher gain (e.g., first imaging mode), whereas even lines of the IR imaging module may utilize an integration time associated with lower gain (e.g., second imaging mode), or vice versa. In this example, the first image may be, or may be generated based on, image data captured by the odd lines of the IR imaging module, and the second image may be, or may be generated based on, image data captured by the even lines. In some cases, the odd lines and the even lines can capture image data (e.g., image portions) of a scene simultaneously, with the odd lines using a different integration time from the even lines. In this regard, the different lines capture different image portions of the scene. The image portions captured by the odd lines and the even lines may collectively form the first image and the second image, respectively.

In some cases, integration time of a single IR imaging module may alternate frame by frame. In these cases, the IR imaging module may transition between (e.g., from and to) capturing an image using the first imaging mode and capturing an image using the second imaging mode. For example, the IR imaging module may alternate between an integration time associated with a higher gain and an integration time associated with a lower gain, such that every other frame is associated with higher/lower gain. In cases that such alternating of integration time is associated with oscillations (e.g., due to a built-in thermal time constant of the detectors) that adversely affect radiometry, such oscillations and/or associated effects on radiometry may be mitigated by changing a frame rate and/or changing a thermal mass of the single IR imaging module's detectors. In this example, the first image may be, or may be generated based on, an image captured by the IR imaging module at a time $t_1$ and the second image may be, or may be generated based on, image data captured by the IR imaging module at a time $t_2$, where the first and second images are temporally adjacent images.

The processing system (e.g., 195) of the IR imaging device may be configured to detect saturated pixels of the first image, determine pixels of the second image corresponding to the saturated pixels of the first image, and generate a combined image based on non-saturated pixels of the first image and the pixels of the second image corresponding to the saturated pixels of the first image.

In some cases, the first and second images may have different spatial resolution and/or otherwise aligned on different image planes. For example, in some cases, the first image and second image may be captured by odd lines and even lines, respectively, of the IR imaging module. The processing system may process the first and/or second images to register (e.g., align and/or match) the first and second images on a common image plane. The processing may include resampling, interpolating, extrapolating, stretching, shrinking, and/or cropping the first and/or second images. In other cases, such as when the first and second images are temporally adjacent images, the first and second images may, but need not, have the same spatial resolution and/or have alignment on a common image plane (e.g., without additional processing).

In some embodiments, image processing may be performed based on 16-bit wide values, 32-bit wide values, and/or any other sizes generally utilized while facilitating enhanced dynamic range IR imaging. In this regard, such pre-specified size may be maintained for backend processing while facilitating enhanced dynamic range IR imaging, thus leaving postprocessing, colorization, and/or other processing steps and any associated circuitry generally unaffected by the dynamic range enhancement. For example, in some cases, an uncooled system may utilize a 13-bit or 14-bit number space out of 16-bit wide values. The remaining two or three bits of the 16-bit wide values may provide room for more thermal dynamics. For example, a thermal sensitive uncooled FPA may use 14-bits for a −40° C. to +120° C. object temperature range including some headroom. In this example, the remaining two or three bits of the 16-bit wide values may allow for a wider temperature range, such as a −40° C. to +500° C. object temperature range.

In some cases, by utilizing the wider temperature range together with higher dynamic range, dual integration times may be utilized to build a 16-bit image. This image may include pixels associated with higher gain to provide higher resolution details while still having the same overall numeric scale (e.g., 16-bit scale) such that 16-bit postprocessing, colorization, and/or other processing can still be utilized. In one aspect, a 16-bit combined image may be generated by combining a first image (e.g., high-gain mode image) and a second image (e.g., low-gain mode image), with postprocessing being performed on the 16-bit combined image. The first and second images may be captured by the same imaging module (e.g., using different integration time) or by different imaging modules. For example, the postprocessing may include tone mapping and/or automatic gain control (AGC).

Where applicable, the various described embodiments may be implemented using hardware, software, or combinations of hardware and software. Also where applicable, the various hardware components and/or software components set forth herein may be combined into composite components comprising software, hardware, and/or both without departing from the spirit of the disclosure. Where applicable, the various hardware components and/or software components set forth herein may be separated into sub-components comprising software, hardware, or both without departing from the spirit of the disclosure. In addition, where applicable, it is contemplated that software components may be implemented as hardware components, and vice-versa. In some embodiments, such hardware components (e.g., processing and control block 120) may be implemented as one or more appropriate processors and/or processing devices (e.g., logic device, microcontroller, processor, application specific integrated circuit (ASIC), field programmable gate array (FPGA), or other device) that may be used to execute appropriate instructions, such as software instructions implementing any of the processes described herein.

Software in accordance with the various described embodiments, such as program code and/or data, may be stored on one or more machine readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

Embodiments described above illustrate but do not limit the invention. It should also be understood that numerous modifications and variations are possible in accordance with the principles of the invention. Accordingly, the scope of the invention is defined only by the following claims.

We claim:

1. A device, comprising:
   a first thermal infrared (IR) imaging module configured to capture a first thermal image for a first field of view (FOV);
   a second thermal IR imaging module configured to capture a second thermal image for a second FOV overlapping, at least in part, with the first FOV, the second thermal IR imaging module optimized for higher thermal IR irradiance than the first thermal IR imaging module; and
   a processing system configured to:
      detect saturated pixels of the first thermal image;
      determine pixels of the second thermal image corresponding to the saturated pixels of the first thermal image; and
      generate a combined image based on non-saturated pixels of the first thermal image and the pixels of the second thermal image corresponding to the saturated pixels of the first thermal image.

2. The device of claim 1, wherein the first thermal IR imaging module comprises a first microbolometer focal plane array (FPA) configured for high-gain, and wherein the second thermal IR imaging module comprises a second microbolometer FPA configured for low-gain.

3. The device of claim 1, wherein the first thermal IR imaging module comprises a photon detector FPA, wherein the second thermal IR imaging module comprises a microbolometer FPA, wherein the photon detector FPA is sensitive to mid-wave IR radiation (MWIR), wherein the microbolometer FPA is sensitive to long-wave IR radiation (LWIR), wherein the processing system is further configured to determine an absolute temperature of an object based on radiometric information captured by the photon detector FPA and the microbolometer FPA, and wherein the first thermal IR imaging module and the second thermal IR imaging module are mechanically and electronically integrated.

4. The device of claim 1, wherein the processing system is configured to register the first thermal image and the second thermal image to a common image plane.

5. The device of claim 4, wherein the first thermal IR imaging module has a higher spatial resolution than the second thermal IR imaging module, and wherein the processing system is configured to resample the second thermal image to align with the first thermal image on the common image plane.

6. The device of claim 5, wherein the processing system is configured to generate the combined image by replacing and/or blending the saturated pixels of the first thermal image with pixels of the resampled second image corresponding to the saturated pixels.

7. The device of claim 4, wherein the processing system is configured to normalize the second thermal image using the non-saturated pixels of the first thermal image and corresponding pixels of the second thermal image on the common image plane.

8. The device of claim 1, wherein the device is configured to perform tone mapping and/or automatic gain control (AGC) after the generation of the combined image, and wherein the combined image is a 16-bit image on which the tone mapping and/or AGC are performed.

9. A method comprising:
   capturing a first thermal image for a first field of view (FOV);
   capturing, concurrently with the capturing of the first thermal image, a second thermal image for a second FOV overlapping, at least in part, with the first FOV, wherein the capturing of the second thermal image is optimized for higher thermal infrared (IR) irradiance than the capturing of the first thermal image;
   detecting saturated pixels of the first thermal image;
   determining pixels of the second thermal image corresponding to the saturated pixels of the first thermal image; and
   generating a combined image based on non-saturated pixels of the first thermal image and the pixels of the second thermal image corresponding to the saturated pixels of the first thermal image.

10. The method of claim 9, further comprising registering the first thermal image and the second thermal image to a common image plane, wherein the first thermal image is captured with a first IR imaging module comprising a first microbolometer focal plane array (FPA) configured for high-gain, and wherein the second thermal image is captured with a second IR imaging module comprising a second microbolometer FPA configured for low-gain.

11. The method of claim 9, wherein the first thermal image is captured with a first IR imaging module comprising a photon detector FPA, and wherein the second thermal image is captured with a second IR imaging module comprising a microbolometer FPA.

12. The method of claim 11, wherein the first and second thermal images are captured with the same IR imaging module.

13. The method of claim 9, wherein the first thermal image has a higher spatial resolution than the second thermal image, wherein the method further comprises resampling the second thermal image to align with the first thermal image on a common image plane, and wherein the generating of the combined image comprises replacing or blending the saturated pixels of the first thermal image with pixels of the resampled second thermal image corresponding to the saturated pixels.

14. A device, comprising:
   an infrared (IR) imaging module configured to capture a first thermal image associated with a first imaging mode and capture a second thermal image associated with a second imaging mode different from the first imaging mode;
   a processing system configured to:
      detect saturated pixels of the first thermal image;
      determine pixels of the second thermal image corresponding to the saturated pixels of the first thermal image; and
      generate a combined image based on non-saturated pixels of the first thermal image and the pixels of the second thermal image corresponding to the saturated pixels of the first thermal image.

15. The device of claim 14, wherein the IR imaging module is configured to capture at least a portion of the first thermal image simultaneous with capturing at least a portion of the second thermal image.

16. The device of claim 14, wherein the IR imaging module is configured to:

capture at least a portion of the first thermal image using the first imaging mode;

transition from the first imaging mode to the second imaging mode after capture of the at least the portion of the first thermal image; and capture at least a portion of the second thermal image using the second imaging mode.

17. The device of claim 14, wherein the IR imaging module comprises:

a first thermal IR imaging module configured to capture the first thermal image; and a second thermal IR imaging module configured to capture the second thermal image.

18. The device of claim 14, wherein the IR imaging module is configured to capture an image comprising the first thermal image and the second thermal image, and wherein the first thermal image forms even lines or odd lines of the image and the second thermal image forms remaining lines of the image.

19. The device of claim 18, wherein the IR imaging module is configured to:

capture a first line of the image according to the first imaging mode;

transition from the first imaging mode to the second imaging mode; and capture a second line of the image according to the second imaging mode, wherein the first line is adjacent to the second line.

20. The device of claim 1, wherein the second thermal IR imaging module is configured to capture the second thermal image concurrent with capturing of the first thermal image by the first thermal IR imaging module.

* * * * *